(12) United States Patent
Isola

(10) Patent No.: US 8,869,922 B1
(45) Date of Patent: Oct. 28, 2014

(54) MOTORIZED WHEELBARROW

(71) Applicant: Robert Isola, Simi Valley, CA (US)

(72) Inventor: Robert Isola, Simi Valley, CA (US)

( * ) Notice: Subject to any disclaimer, the term of this patent is extended or adjusted under 35 U.S.C. 154(b) by 0 days.

(21) Appl. No.: 14/048,276

(22) Filed: Oct. 8, 2013

(51) Int. Cl.
   *B62D 1/18* (2006.01)
   *B62B 5/00* (2006.01)
   *B62B 1/18* (2006.01)

(52) U.S. Cl.
   CPC .. *B62B 5/003* (2013.01); *B62B 1/18* (2013.01)
   USPC ...................................... 180/19.1; 280/47.31

(58) Field of Classification Search
   CPC ........... B62D 54/04; B62B 1/18; B62B 5/003
   USPC ........... 180/19.1, 19.2, 19.3; 280/47.17, 47.2, 280/47.31
   See application file for complete search history.

(56) References Cited

U.S. PATENT DOCUMENTS

| | | | | |
|---|---|---|---|---|
| 3,791,470 A * | 2/1974 | Baddorf et al. | ............... | 180/19.1 |
| 5,211,254 A * | 5/1993 | Harris et al. | .................. | 180/19.1 |
| 5,305,843 A * | 4/1994 | Armstrong | ................... | 180/19.1 |
| D357,101 S | 4/1995 | Uyehara | | |
| 5,465,801 A * | 11/1995 | Hoover | ......................... | 180/19.1 |
| 5,489,000 A * | 2/1996 | Hillbohm | ..................... | 180/19.1 |
| 5,878,827 A * | 3/1999 | Fox | ................................ | 180/19.1 |
| 6,065,555 A | 5/2000 | Yuki et al. | | |
| 6,129,166 A | 10/2000 | Sueshige | | |
| 6,474,007 B1 | 11/2002 | Sueshige | | |
| 6,745,859 B2 * | 6/2004 | Simons et al. | ............... | 180/19.1 |
| 7,775,306 B1 * | 8/2010 | Adkins | ......................... | 180/19.3 |
| 7,793,744 B1 | 9/2010 | Hardie | | |
| 8,235,153 B2 * | 8/2012 | Robinson et al. | ............ | 180/19.3 |
| 2012/0146386 A1 | 6/2012 | Rowlands | | |

* cited by examiner

*Primary Examiner* — Anne Marie Boehler

(57) ABSTRACT

The motorized wheelbarrow includes a motor and drive train to propel the wheelbarrow. The wheelbarrow includes a wheel, a bucket, a stand, and handles. The motor is mounted underneath the bucket and provides mechanical power to the wheel via a drive train comprising a chain and sprocket configuration or a drive shaft and differential configuration. The motor is controlled with a throttle, push button start, and kill switch provided on the handles of the wheelbarrow. The wheelbarrow also features a handbrake that operates a disk brake provided adjacent the wheel in order to stop the wheelbarrow as needed. The motorized wheelbarrow makes reduces the strain associated with use of a wheelbarrow.

7 Claims, 7 Drawing Sheets

MOTORIZED WHEELBARROW

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of wheelbarrows, more specifically, a wheelbarrow that includes a motor to drive the wheelbarrow.

SUMMARY OF THE INVENTION

An embodiment of the disclosure meets the needs presented above by generally comprising a wheelbarrow that includes a motor and drive train to propel the wheelbarrow. The wheelbarrow includes a wheel, a bucket, a stand, and handles. The motor is mounted underneath the bucket and provides mechanical power to the wheel via a drive train comprising a chain and sprocket configuration or a drive shaft and differential configuration. The motor is controlled with a throttle, push button start, and kill switch provided on the handles of the wheelbarrow. The wheelbarrow also features a handbrake that operates a disk brake needed. The motorized wheelbarrow makes reduces the strain associated with use of a wheelbarrow.

An object of the invention is to provide a wheelbarrow that is motorized in order to self-propel the wheelbarrow.

Another object of the invention is for the wheelbarrow to include a brake that can slow or stop the motorized wheelbarrow.

Another object of the invention is for the drive train in mechanical communication between the wheel and motor to comprise a chain and sprocket configuration or a drive shaft and differential configuration.

These together with additional objects, features and advantages of the motorized wheelbarrow will be readily apparent to those of ordinary skill in the art upon reading the following detailed description of presently preferred, but nonetheless illustrative, embodiments of the motorized wheelbarrow when taken in conjunction with the accompanying drawings.

In this respect, before explaining the current embodiments of the motorized wheelbarrow in detail, it is to be understood that the motorized wheelbarrow is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the motorized wheelbarrow.

It is therefore important that the claims be regarded as including such equivalent construction insofar as they do not depart from the spirit and scope of the motorized wheelbarrow. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
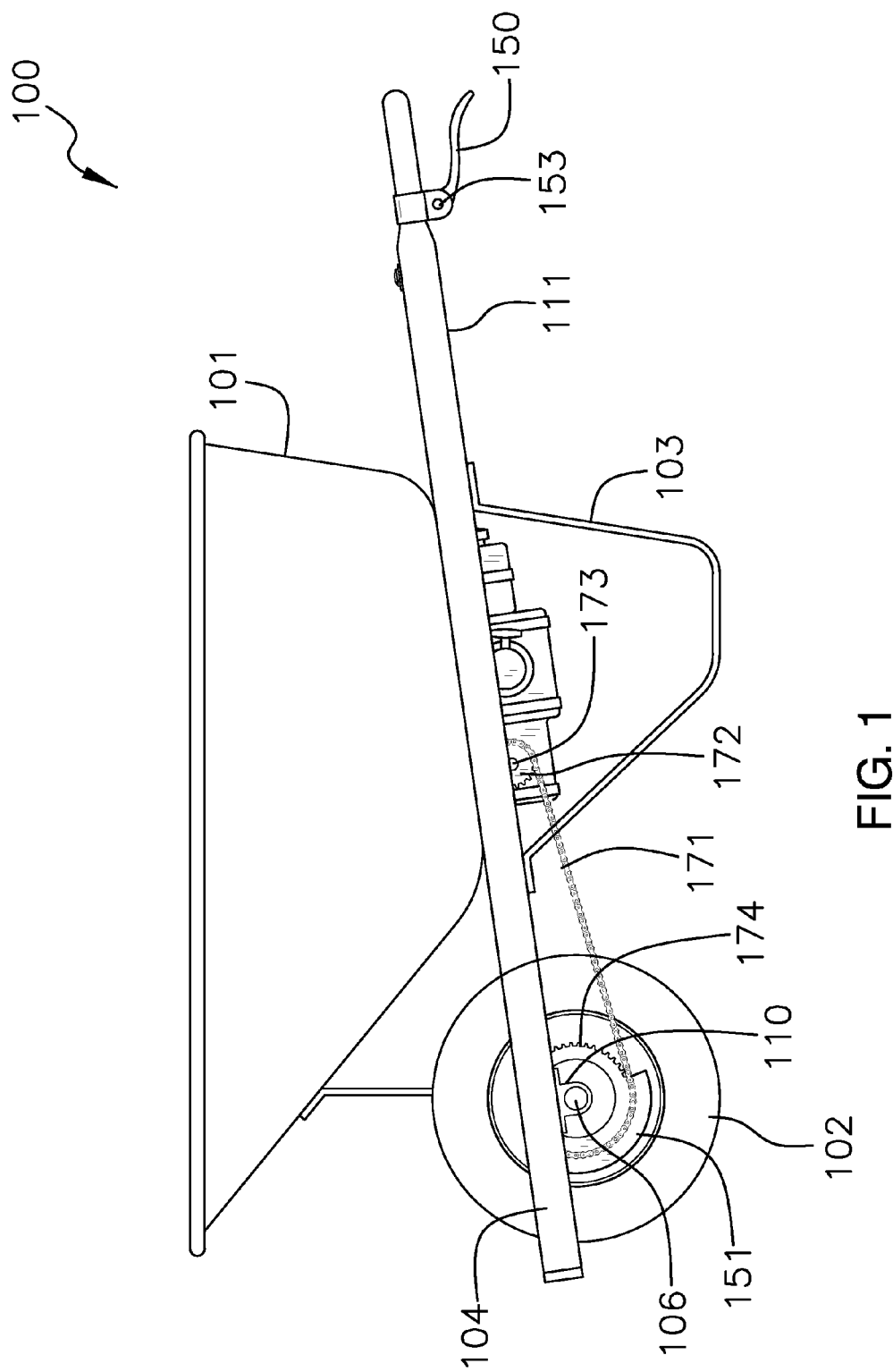
FIG. 1 is a side view of the motorized wheelbarrow.
Figure 2:
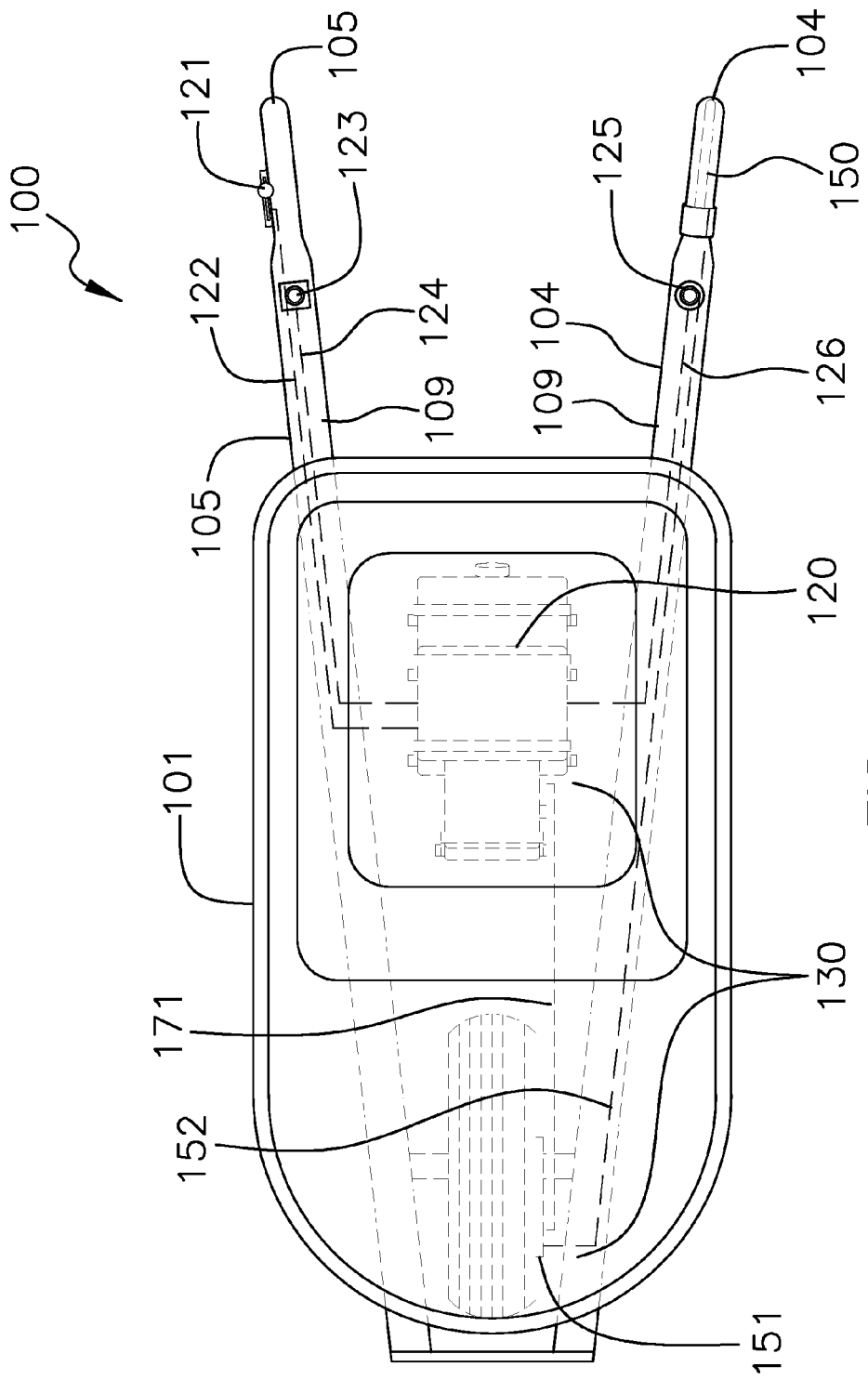
FIG. 2 is a top view of the motorized wheelbarrow.
Figure 3:
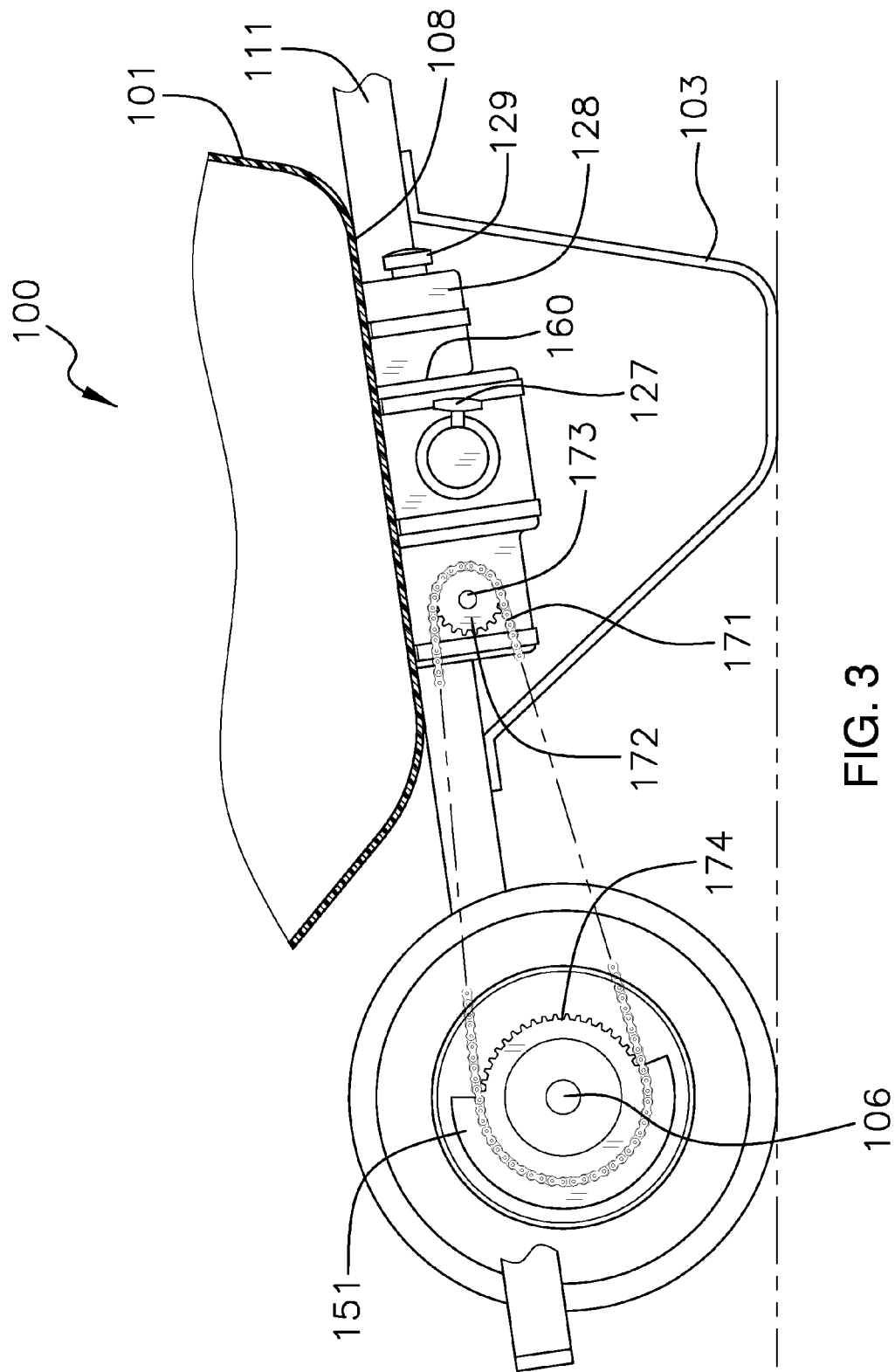
FIG. 3 is a detailed side view of the motorized wheelbarrow.
Figure 4:
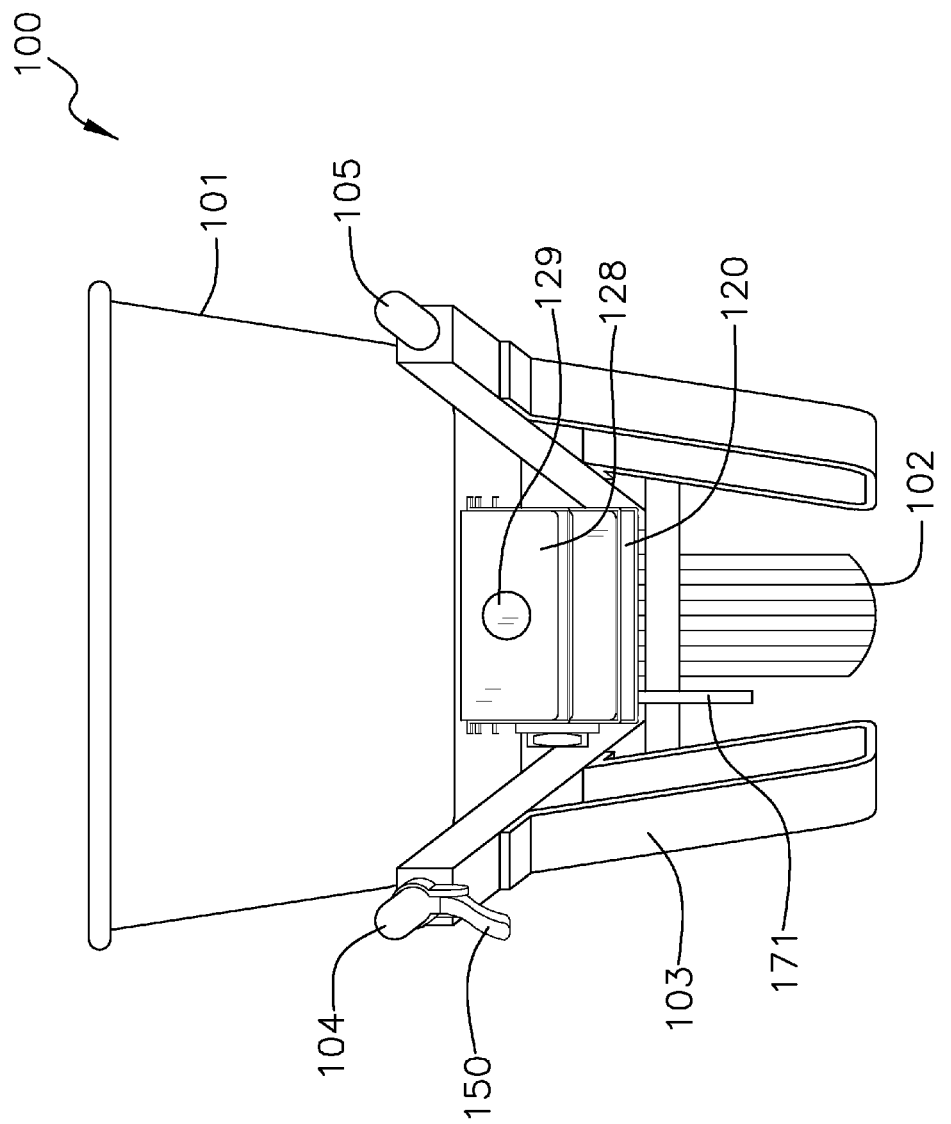
FIG. 4 is a rear view of the motorized wheelbarrow.
Figure 5:
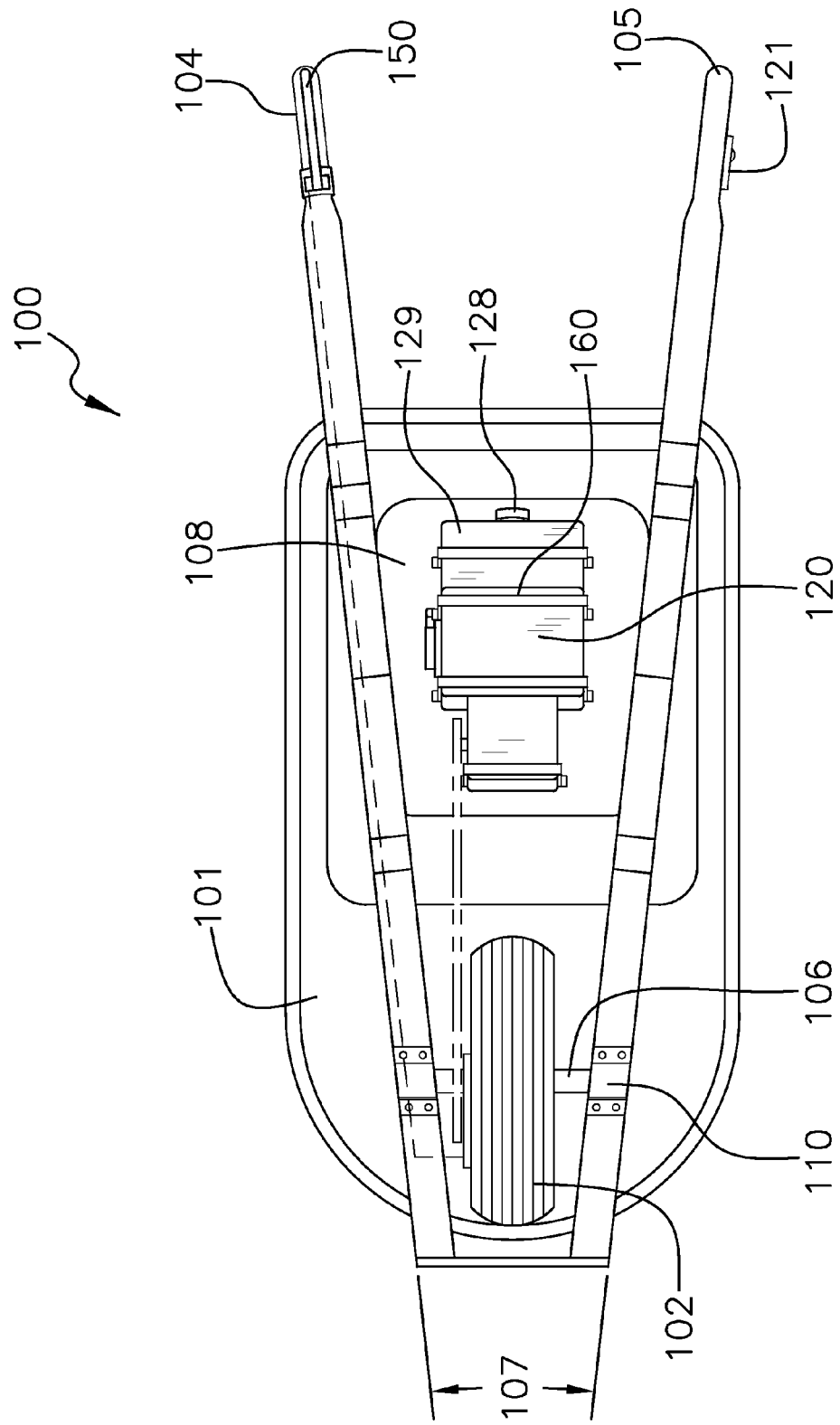
FIG. 5 is a bottom view of the motorized wheelbarrow.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

As best illustrated in FIGS. 1 through 7, the motorized wheelbarrow 100 (hereinafter invention) is further comprised of a bucket 101, a wheel 102, a stand 103, a first handle 104, and a second handle 105.

The wheel 102 is able to rotate with respect to a wheel shaft 106 that extends between the first handle 104 and second handle 105. The first handle 104 and the second handle 105 are of an undefined length, and are oriented at an acute angle 107 there between. The wheel shaft 106 connects to both the first handle 104 and the second handle 105. Moreover, the wheel shaft 106 connects to the first handle 104 and the second handle 105 via bearing members 110. The bucket 101 is further defined with a bottom surface 108 that is affixed to a top surface 109 of both the first handle 104 and the second handle 105. The stand 103 is affixed to a bottom handle surface 111 of the first handle 104 as well as the second handle 105.

The bottom surface 108 of the bucket 102 includes a motor 120 that is in mechanical communication with a drive train 130, which will be discussed further below. The motor 120 includes a throttle 121 that is positioned on either the first handle 104 or the second handle 105. More specifically, the throttle 121 is positioned on the top surface 109 of either the first handle 104 or the second handle 105. The throttle 121 connects with the motor 120 via throttle wire 122. The motor 120 is also connected with a push button start 123 that is located on either the first handle 104 or the second handle 105. The push button start 123 is connected via a start wire 124 to the motor 120. The motor 120 is also connected to a kill switch 125, which is located on either the first handle 104 or the second handle 105. The kill switch 125 connects to the motor 120 via a kill wire 126.

The motor 120 optionally includes a pull start 127 to turn on the motor 120 as needed or in lieu of the push button start 123. Moreover, the motor 120 includes a gas tank 128 and gas cap 129 that are oriented towards a rear portion 160 of the motor 120. The motor 120 is ideally of the internal combustion ilk, and may run on gas, diesel, or other hydrocarbon. However, it shall be noted that the term "motor" is being used loosely to define the component of the invention 100 that provides mechanical power to propel the invention 100, and may involve other forms, including but not limited to, electrically-driven motors.

The invention 100 also includes a handbrake 150 that is located on either the first handle 104 or the second handle 105, and is in mechanical communication with a disk brake 151 located adjacent the wheel 102. A brake wire 152 extends from the handbrake 150 to the disk brake 151. The disk brake 151 is able to stop or slow down the rotational speed of the wheel 102 upon pulling the handbrake 150. The handbrake 150 rotates about a brake pivot 153. The handbrake 150 is secured to the bottom handle surface 111 of either the first handle 104 or the second handle 105.

Figure 6:
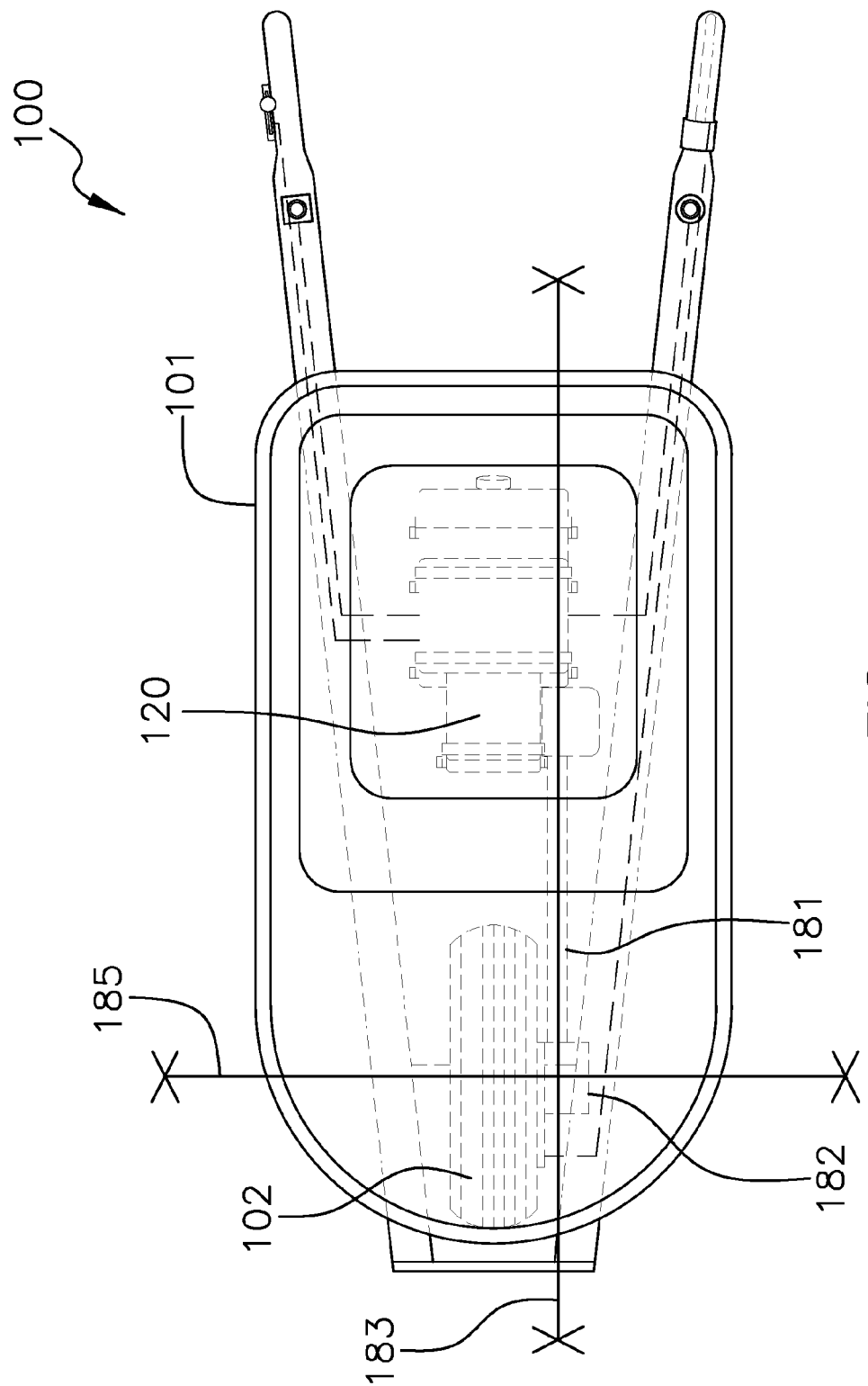
FIG. 6 is a top view of another embodiment of the motorized wheelbarrow.
Figure 7:
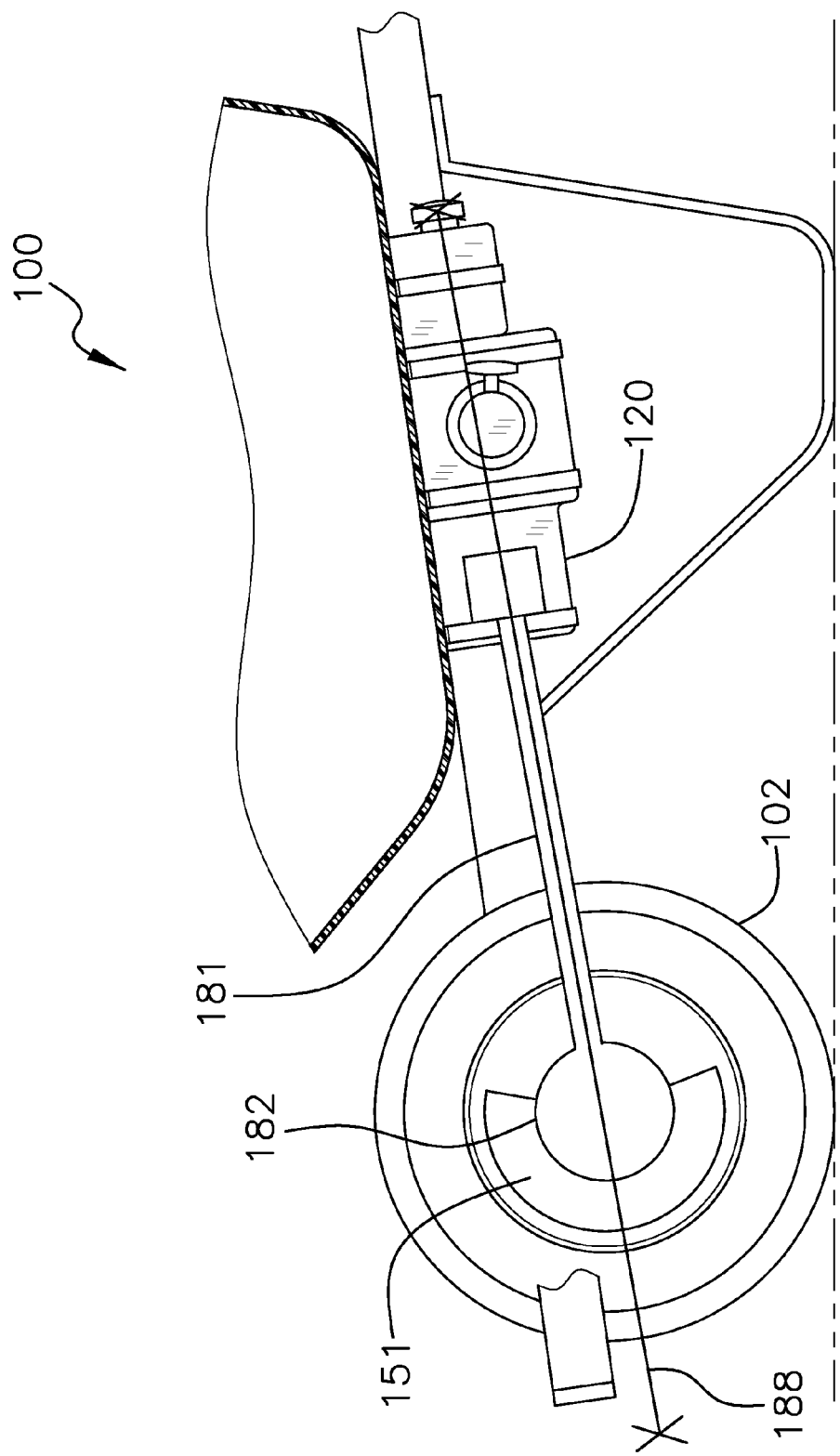
FIG. 7 is a detailed side view of another embodiment of the motorized wheelbarrow.

The invention 100 includes a drive train 130 in a generic sense. The drive train 130 is the component of the invention 100 that transfers the output power of the motor 120 to the wheel 102. The invention 100 is depicted as including one of two types of drive trains 130, which may be further defined as a chain and sprocket configuration or a drive shaft. The chain and sprocket configuration is depicted in FIGS. 1-5; whereas the drive shaft is depicted in FIGS. 6-7.

The chain and sprocket configuration of the drive train 130 utilizes a chain 171 that engages a motor sprocket 172 provided on a motor output shaft 173, and a wheel sprocket 174 provided on the wheel shaft 106.

The drive shaft of the drive train 130 utilizes a drive shaft 181 that connects to the motor 120. The drive shaft 181 connects with an element 182 that transfers the rotational motion of the drive shaft 181 with respect to a drive axle axis 183 to a wheel axle axis 185 that is consistent with the wheel 102. Moreover, the wheel axle axis 185 is perpendicular with respect to the drive axle axis 183.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A motorized wheelbarrow comprising:
   a bucket affixed to a first handle and a second handle;
   wherein a wheel is affixed to the first handle and the second handle;
   wherein a motor is located underneath said bucket and is in mechanical communication with a drive train that is in mechanical communication with the wheel so as to drive the wheelbarrow;
   wherein the wheel rotates with respect to a wheel shaft that extends between the first handle and second handle;
   wherein the first handle and the second handle are oriented at an acute angle there between;
   wherein the wheel shaft connects to both the first handle and the second handle; wherein the wheel shaft connects to the first handle and the second handle via bearing members, which provides motion from both the first handle and the second handle to the wheel shaft;
   wherein the bucket is further defined with a bottom surface that is affixed to a top surface of both the first handle and the second handle; wherein a stand is affixed to a bottom handle surface of the first handle as well as the second handle;
   wherein the bottom surface of the bucket includes the motor thereon; wherein the motor includes a throttle that is positioned on either the first handle or the second handle; wherein the throttle is positioned on the top surface of either the first handle or the second handle; wherein the throttle connects with the motor via a throttle wire;
   wherein the motor is also connected with a push button start that is located on either the first handle or the second handle; wherein the push button start is connected via a start wire to the motor;
   wherein the motor is also connected to a kill switch, which is located on either the first handle or the second handle; wherein the kill switch connects to the motor via a kill wire.

2. The motorized wheelbarrow according to claim 1 wherein the motor includes a pull start to turn on the motor as needed or in lieu of the push button start; wherein the motor includes a gas tank and gas cap that are oriented towards a rear portion of the motor.

3. The motorized wheelbarrow according to claim 2 wherein a handbrake is located on either the first handle or the second handle, and is in mechanical communication with a disk brake located adjacent the wheel; wherein a brake wire extends from the handbrake to the disk brake; wherein the disk brake stops or slows the rotational speed of the wheel upon pulling the handbrake.

4. The motorized wheelbarrow according to claim 3 wherein the handbrake rotates about a brake pivot; wherein the handbrake is secured to the bottom handle surface of either the first handle or the second handle.

5. The motorized wheelbarrow according to claim 4 wherein the drive train comprises a drive shaft.

6. The motorized wheelbarrow according to claim 5 wherein the drive shaft of the drive train utilizes a drive shaft that connects to the motor; wherein the drive shaft that transfers the rotational motion of the drive shaft with respect to a drive axle axis to a wheel axle axis that is consistent with the wheel; wherein the wheel axle axis is perpendicular with respect to the drive axle axis.

7. A motorized wheelbarrow comprising:
   a bucket affixed to a first handle and a second handle;
   wherein a wheel is affixed to the first handle and the second handle;
   wherein a motor is located underneath said bucket and is in mechanical communication with a drive train that is in mechanical communication with the wheel so as to drive the wheelbarrow;

wherein the wheel rotates with respect to a wheel shaft that extends between the first handle and second handle; wherein the first handle and the second handle are oriented at an acute angle there between;

wherein the wheel shaft connects to both the first handle and the second handle; wherein the wheel shaft connects to the first handle and the second handle via bearing members, which provides rotational motion;

wherein the bucket is further defined with a bottom surface that is affixed to a top surface of both the first handle and the second handle; wherein a stand is affixed to a bottom handle surface of the first handle as well as the second handle;

wherein the bottom surface of the bucket includes the motor thereon; wherein the motor includes a throttle that is positioned on either the first handle or the second handle; wherein the throttle is positioned on the top surface of either the first handle or the second handle; wherein the throttle connects with the motor via a throttle wire;

wherein the motor is also connected with a push button start that is located on either the first handle or the second handle; wherein the push button start is connected via a start wire to the motor; wherein the motor is also connected to a kill switch, which is located on either the first handle or the second handle; wherein the kill switch connects to the motor via a kill wire; wherein the motor includes a pull start to turn on the motor as needed or in lieu of the push button start; wherein the motor includes a gas tank and gas cap that are oriented towards a rear portion of the motor;

wherein a handbrake is located on either the first handle or the second handle, and is in mechanical communication with a disk brake located adjacent the wheel; wherein a brake wire extends from the handbrake to the disk brake; wherein the disk brake stops or slows the rotational speed of the wheel upon pulling the handbrake; wherein the handbrake rotates about a brake pivot; wherein the handbrake is secured to the bottom handle surface of either the first handle or the second handle;

wherein the drive train comprises a drive shaft;

wherein the drive shaft of the drive train utilizes a drive shaft that connects to the motor; wherein the drive shaft transfers the rotational motion of the drive shaft with respect to a drive axle axis to a wheel axle axis that is consistent with the wheel; wherein the wheel axle axis is perpendicular with respect to the drive axle axis.

* * * * *